(12) United States Patent
Kim et al.

(10) Patent No.: US 10,884,171 B2
(45) Date of Patent: Jan. 5, 2021

(54) BEAM DEFLECTOR AND HOLOGRAPHIC THREE-DIMENSIONAL IMAGE DISPLAY APPARATUS EMPLOYING THE SAME

(71) Applicant: SAMSUNG ELECTRONICS CO., LTD., Suwon-si (KR)

(72) Inventors: Young Kim, Yongin-si (KR); Jungkwuen An, Suwon-si (KR); Hoon Song, Yongin-si (KR); Kanghee Won, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 189 days.

(21) Appl. No.: 16/101,025

(22) Filed: Aug. 10, 2018

(65) Prior Publication Data

US 2019/0257993 A1   Aug. 22, 2019

(30) Foreign Application Priority Data

Feb. 19, 2018   (KR) .................... 10-2018-0019532

(51) Int. Cl.
| | |
|---|---|
| *G02B 5/32* | (2006.01) |
| *G02F 1/1343* | (2006.01) |
| *G02F 1/13357* | (2006.01) |
| *G02B 27/09* | (2006.01) |
| *G02B 5/30* | (2006.01) |
| *G03H 1/22* | (2006.01) |

(52) U.S. Cl.
CPC .............. *G02B 5/32* (2013.01); *G02B 5/30* (2013.01); *G02B 27/0977* (2013.01); *G02F 1/1343* (2013.01); *G02F 1/133602* (2013.01); *G03H 1/2294* (2013.01); *G02F 2201/121* (2013.01)

(58) Field of Classification Search
CPC ........ G02B 5/32; G02B 27/0977; G02B 5/30; G02B 30/26; G02F 1/1343; G02F 1/133602; G02F 2201/121; G02F 1/1345; G02F 1/134309; G02F 2001/133638; G02F 1/13471; G02F 2001/291; G03H 1/2294; G03H 1/2286; H04N 13/302
See application file for complete search history.

(56) References Cited

U.S. PATENT DOCUMENTS

| | | | | |
|---|---|---|---|---|
| 5,126,869 | A  * | 6/1992 | Lipchak | ............... G01S 7/4811 349/117 |
| 5,943,159 | A  * | 8/1999 | Zhu | ........................ G02F 1/292 359/254 |
| 8,284,241 | B2 | 10/2012 | Shestak et al. | |
| 9,140,912 | B2 | 9/2015 | Choe et al. | |
| 9,406,166 | B2 | 8/2016 | Futterer | |
| 10,234,696 | B2 * | 3/2019 | Popovich | ............... G02B 27/48 |

\* cited by examiner

*Primary Examiner* — Tuyen Tra
(74) *Attorney, Agent, or Firm* — Sughrue Mion, PLLC

(57) ABSTRACT

A beam deflector and a holographic three-dimensional image display apparatus employing the same are provided. The beam deflector deflects light through two stages by a first beam deflector that deflects the light in a first moving direction making an angle with a horizontal direction and a vertical direction, such that the deflected light is oriented to a first location, and a second beam deflector that deflects the light incident from the first beam deflector such that the light is deflected in a second moving direction making an angle with the horizontal direction and the vertical direction at the first location and is oriented to a second location.

20 Claims, 11 Drawing Sheets

BEAM DEFLECTOR AND HOLOGRAPHIC THREE-DIMENSIONAL IMAGE DISPLAY APPARATUS EMPLOYING THE SAME

CROSS-REFERENCE TO RELATED APPLICATION

This application claims priority from Korean Patent Application No. 10-2018-0019532, filed on Feb. 19, 2018 in the Korean Intellectual Property Office, the disclosure of which is incorporated herein in its entirety by reference.

BACKGROUND

1. Field

Example embodiments of the present disclosure relate to a beam deflector and a holographic three-dimensional image display apparatus employing the same.

2. Description of the Related Art

A holographic display is considered to be an ultimate three-dimensional (3D) display since the holographic display represents a vivid 3D image in a wide depth representation area without causing a fatigue feeling in an observer viewing the 3D image. However, to implement a holographic display, a spatial light modulator (SLM) having pixels of a wavelength size, a surface light source having coherency, and a processor for performing a relatively large amount of computer generated hologram (CGH) computations are necessary.

Recently, researches for manufacturing an a usable holographic display by using devices realizable have been conducted. A display having a high resolution liquid crystal display (LCD) panel for modulating widely spread light and focusing the modulated light on the eyes to form a hologram has been developed.

A holographic display requires an optical system for converting a general image signal into a holographic image signal, and then delivering the converted image to both eyes to show a stereoscopic image.

SUMMARY

One or more example embodiments provide a beam deflector applicable to form a stereoscopic image by delivering a holographic image to both eyes and a holographic three-dimensional image display apparatus employing the same.

Additional aspects will be set forth in part in the description which follows and, in part, will be apparent from the description, or may be learned by practice of the presented embodiments.

According to an aspect of an example embodiment, there is provided a beam deflector including a first beam deflector which includes a plurality of first pattern electrodes provided in a first moving direction and including a stripe shape extending in a direction crossing the first moving direction, the first beam deflector being configured to deflect incident light in the first moving direction making an angle with a horizontal direction and a vertical direction, respectively, and oriented to a first location, and the first beam deflector including liquid crystals aligned such that long axes of the liquid crystals are parallel to the first moving direction when an electric field is not applied thereto, a second beam deflector which includes a plurality of second pattern electrodes provided in a second moving direction and including a stripe shape extending in a direction crossing the second moving direction, the second beam deflector being configured to deflect the incident light in the second moving direction making an angle with the horizontal direction and the vertical direction, respectively, at the first location, and oriented to a second location, and the second beam deflector including liquid crystals aligned such that long axes of the liquid crystals are parallel to the second moving direction when electric field is not applied thereto, and a polarization converter provided between the first beam deflector and the second beam deflector and configured to convert polarization of the light incident to the second beam deflector such that the light deflected to the first moving direction by the first beam deflector is deflected to the second moving direction by the second beam deflector.

The beam deflector, wherein the first beam deflector may include a first electrode layer including the plurality of first pattern electrodes on a first substrate, a second electrode layer used as a common electrode on a second substrate, and a first liquid crystal layer including liquid crystals aligned between the first substrate and the second substrate such that long axes of the liquid crystals are parallel to the first moving direction when electric field is not applied thereto, and wherein each of the second beam deflectors may include a third electrode layer including the plurality of second pattern electrodes on a third substrate, a fourth electrode layer used as a common electrode on a fourth substrate, and a liquid crystal layer including liquid crystals aligned between the first substrate and the second substrate such that long axes of the liquid crystals are parallel to the second moving direction when electric field is not applied thereto.

The polarization converter may include a quarter waveplate.

The first moving direction and the second moving direction may make an angle of 45° or less with the horizontal direction and the vertical direction, respectively.

The first pattern electrodes and the second pattern electrodes may make an angle of 45° with the horizontal direction and the vertical direction.

The plurality of first pattern electrodes and the plurality of second electrodes may include a plurality of unit electrodes, each unit electrode including n pattern electrodes, and ith pattern electrodes of respective unit electrodes may be electrically connected to each other such that a same voltage is applied to each of the ith pattern electrodes.

The n pattern electrodes may include 720 or 1024 pattern electrodes, and the plurality of unit electrodes may include 7 to 10 unit electrodes.

The beam deflector may further include n line electrodes including an ith line electrode connecting the ith pattern electrodes of the respective unit electrodes.

The n line electrodes are provided in parallel to the horizontal direction or the vertical direction.

According to an aspect of another example embodiment, there is provided a backlight unit including a light source configured to emit light, a beam deflector configured to deflect the light emitted by the light source through two stages, and a light guide plate configured to guide the light deflected by the beam deflector and configured to output the light through a light-output surface of the light guide plate, wherein the beam deflector includes the beam deflector.

According to an aspect of another example embodiment, there is provided a holographic three-dimensional (3D) image display apparatus including a backlight unit configured to emit light, and a spatial light modulator configured to form a holographic image by modulating light emitted by the backlight unit, wherein the backlight unit includes light source configured to emit light, a beam deflector configured to deflect the light emitted by the light source through two stages, the beam deflector including a first beam deflector configured to deflect the light emitted by the light source in a first moving direction making an angle with a horizontal direction and a vertical direction, respectively, such that the deflected light is oriented to a first location, and a second beam deflector configured to deflect the light deflected from the first beam deflector such that the light is deflected in a second moving direction making an angle with the horizontal direction and the vertical direction, respectively, at the first location and is oriented to a second location, and a light guide plate configured to guide the light deflected from the beam deflector and output the light through a light-output surface of the light guide plate.

The first beam deflector may include a plurality of first pattern electrodes provided in the first moving direction and including a stripe shape extending in a direction crossing the first moving direction, the first beam deflector being configured to deflect incident light in the first moving direction and is oriented to the first location, and including liquid crystals aligned such that long axes of the liquid crystals are parallel to the first moving direction when electric field is not applied thereto, the second beam deflector may include a plurality of second pattern electrodes provided in the second moving direction and including a stripe shape extending in a direction crossing the second moving direction, the second beam deflector being configured to deflect the incident light in the second moving direction at the first location and is oriented to the second location, and the second beam deflector including liquid crystals aligned such that long axes of the liquid crystals are parallel to the second moving direction when electric field is not applied thereto, and the beam deflector may further include a polarization converter provided between the first beam deflector and the second beam deflector and configured to convert polarization of the light incident to the second beam deflector such that the light deflected to the first moving direction by the first beam deflector is deflected to the second moving direction by the second beam deflector.

The holographic 3D image display apparatus, wherein the first beam deflector may include a first electrode layer including the plurality of first pattern electrodes on a first substrate, a second electrode layer used as a common electrode on a second substrate, and a liquid crystal layer including first liquid crystals aligned between the first substrate and the second substrate such that long axes of the liquid crystals are parallel to the first moving direction when the electric field is not applied thereto, and wherein each of the second beam deflectors may include a third electrode layer including the plurality of second pattern electrodes on a third substrate, a fourth electrode layer used as a common electrode on a fourth substrate, and a second liquid crystal layer including liquid crystals aligned between the third substrate and the fourth substrate such that long axes of the liquid crystals are parallel to the second moving direction when the electric field is not applied thereto.

The polarization converter may include a quarter waveplate.

The plurality of first pattern electrodes and the plurality of second pattern electrodes may include a plurality of unit electrodes, each unit electrode including n pattern electrodes, and ith pattern electrodes of respective unit electrodes may be electrically connected to each other such that a same voltage is applied to each of the ith pattern electrodes.

The n pattern electrodes may include 720 or 1024 pattern electrodes, and the plurality of unit electrodes may include 7 to 10 unit electrodes.

The holographic 3D image display apparatus may further include n line electrodes including an ith line electrode connecting the ith pattern electrodes of the respective unit electrodes.

The n line electrodes may be provided in a direction parallel to the horizontal direction or the vertical direction, respectively.

The first moving direction and the second moving direction may make an angle of 45° or less with the horizontal direction and the vertical direction, respectively.

The plurality of first pattern electrodes and the plurality of second pattern electrodes may make an angle of 45° with the horizontal direction and the vertical direction.

According to an aspect of another example embodiment, there is provided a beam deflector including a first beam deflector which includes a plurality of first pattern electrodes provided in a first moving direction and including a stripe shape extending in a direction crossing the first moving direction, the first beam deflector being configured to deflect incident light in the first moving direction making an angle of 45° or less with a horizontal direction and a vertical direction, respectively, and oriented to a first location, and the first beam deflector including liquid crystals aligned such that long axes of the liquid crystals are parallel to the first moving direction when an electric field is not applied thereto, a second beam deflector which includes a plurality of second pattern electrodes provided in a second moving direction and including a stripe shape extending in a direction crossing the second moving direction, the second beam deflector being configured to deflect the incident light in the second moving direction making an angle of 45° or less with the horizontal direction and the vertical direction, respectively, at the first location, and oriented to a second location, and the second beam deflector including liquid crystals aligned such that long axes of the liquid crystals are parallel to the second moving direction when an electric field is not applied thereto, and a polarization converter provided between the first beam deflector and the second beam deflector and configured to convert polarization of the light incident to the second beam deflector, such that the light deflected to the first moving direction by the first beam deflector is deflected to the second moving direction by the second beam deflector.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
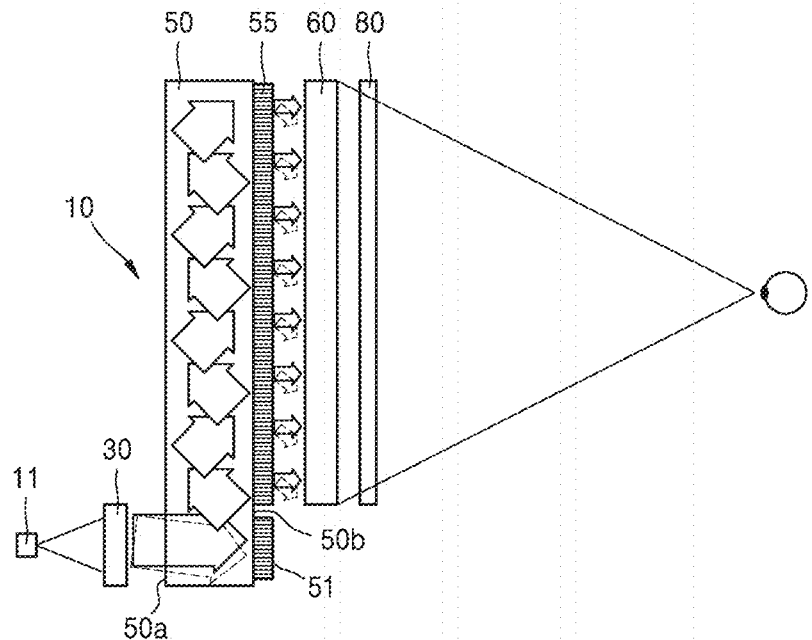
FIG. 1 illustrates a configuration of a holographic three-dimensional image display apparatus including a beam deflector and a backlight unit employing the same according to an example embodiment.

Hereinafter, a beam deflector according to an example embodiment and a holographic three-dimensional image display apparatus employing the same will be described in detail with reference to the accompanying drawings. In the drawings, like reference numerals refer to like elements, and the thickness or size of each component may be exaggerated for convenience of description. Example embodiments described below are only illustrative, and various modifications may be formed from the example embodiments. In addition, a case where a holographic three-dimensional image display apparatus is implemented by applying a beam deflector according to an example embodiment to a backlight unit will be described and shown, but example embodiments are not limited thereto, and a beam deflector according to an example embodiment may be applied to implement various systems without crosstalk in beam deflection.

It will be understood that, although the terms first, second, etc. may be used herein to describe various elements, these elements should not be limited by these terms. These terms are only used to distinguish one element from another. In the specification, unless explicitly described to the contrary, the word "comprise" and variations such as "comprises" or "comprising," will be understood to imply the inclusion of stated elements but not the exclusion of any other elements.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 illustrates a configuration of a holographic three-dimensional (3D) image display apparatus including a beam deflector 30 and a backlight unit 10 employing the same according to an example embodiment.

Referring to FIG. 1, the holographic 3D image display apparatus includes the backlight unit 10 and a spatial light modulator (SLM) 80 that modulates light provided from the backlight unit 10 to form a holographic pattern for reproducing a holographic image. The holographic pattern formed by the SLM 80 is formed as a holographic image on a space by focusing of a lens 60. The lens 60 may be disposed between the backlight unit 10 and the SLM 80. However, example embodiments are not limited thereto, and the lens 60 may be disposed at the front of the SLM 80.

The SLM 80 may form a holographic pattern for diffracting incident light according to a hologram signal provided from an image signal processor to modulate the incident light. The SLM 80 may employ any one of a phase modulator capable of performing only phase modulation, an amplitude modulator capable of performing only amplitude modulation, and a complex modulator capable of performing both phase modulation and amplitude modulation. Although FIG. 1 shows that the SLM 80 is a transmissive SLM, a reflective SLM may also be used. When the SLM 80 is a transmissive SLM, the SLM 80 may employ, for example, a semiconductor modulator based on a compound semiconductor such as gallium arsenide (GaAs) or a liquid crystal device (LCD). When the SLM 80 is a reflective SLM, the SLM 80 may employ, for example, a digital micro-mirror device (DMD), a liquid crystal on silicon (LCoS), or a semiconductor modulator.

Figure 8:
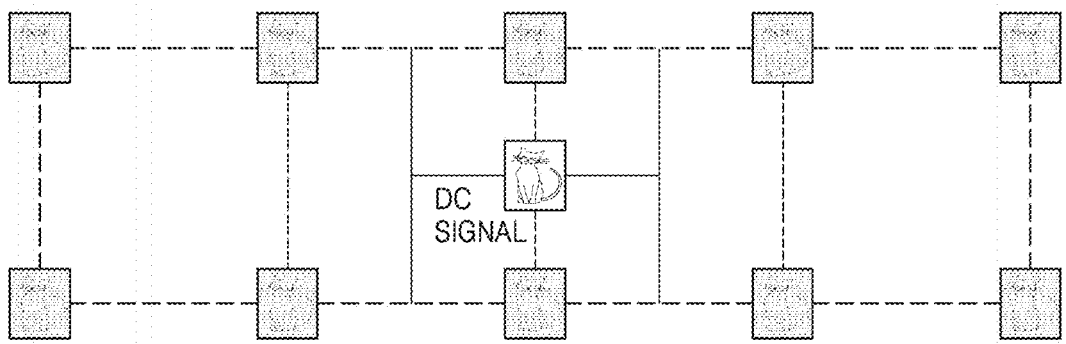
FIG. 8 illustrates a holographic image and a plurality of lattice spots formed on a focal plane by a spatial light modulator (SLM) according to an example embodiment.
Figure 9:
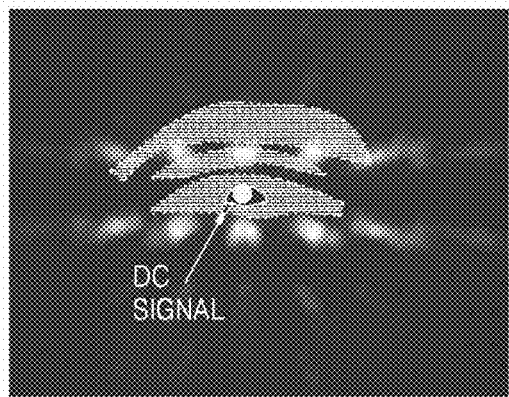
FIG. 9 illustrates an example of a plurality of lattice spots acting as image noise when the plurality of lattice spots are formed on a focal plane.

Since the SLM 80 includes an array of a plurality of pixels, the array of the plurality of pixels acts as a pixel lattice. Therefore, light incident to the SLM 80 may be diffracted and interfered by not only the holographic pattern formed by the SLM 80 but also the pixel lattice configured with the array of the plurality of pixels in the SLM 80. In addition, a portion of the incident light may be transmitted through the SLM 80 without being diffracted by the holographic pattern. As a result, both a holographic image (direct current (DC) signal) and a plurality of lattice spots may appear on a focal plane of the lens 60, on which the holographic image is gathered as spots, as shown in FIG. 8. The plurality of lattice spots may be viewed by an eye of an observer, as shown in FIG. 9, and thus the plurality of lattice spots may act as image noise causing image quality of the holographic image to be deteriorated and causing an observer to be inconvenienced in viewing the holographic image.

The image noise may be deviated from the eye of the observer by the beam deflector 30 according to an example embodiment, which is applied to the backlight unit 10 to deliver the holographic image to both eyes such that a stereoscopic image is viewed by the observer, as described below, and thus, the observer may view only the holographic image without the image noise.

The backlight unit 10 may include a light source 11 that generates illumination light, the beam deflector 30 that deflects the illumination light through two stages such that the holographic image is delivered to both eyes so as to view a stereoscopic image, and the image noise is simultaneously deviated from the eyes of the observer, and a light guide plate 50 that guides the illumination light incident through a light-input surface thereof from the beam deflector 30 to travel through the inside of the light guide plate 50 and outputs the illumination light through a light-output surface. In addition, the backlight unit 10 may further include an input coupler 51 that makes the illumination light incident through the light-input surface of the light guide plate 50 travel through the inside of the light guide plate 50, and an output coupler 55 that outputs the illumination light to the outside through the light-output surface of the light guide plate 50. In addition, the backlight unit 10 may further include a collimating lens that collimates the illumination light be emitted from the light source 11 to be parallel light, and incident to the input coupler 51. When the light source 11 generates collimated illumination light by itself, the collimating lens may be omitted.

The light source 11 may be a coherent light source that emits coherent light. To provide light having higher coherency, for example, one or more laser diodes may be used as the light source 11. However, if light has only a certain degree of spatial coherency, the light may be sufficiently diffracted and modulated by the SLM 80, and thus, for example, a light emitting diode (LED) may be used as the light source 11. According to example embodiments, any other light source may be used if the light source emits light having spatial coherency. In addition, although FIG. 1 shows the light source 11 as only one block, the light source 11 may include an array of a plurality of spot light sources. For example, the light source 11 may include a plurality of red laser diodes, a plurality of green laser diodes, and a plurality of blue laser diodes.

The light guide plate 50 may be made of transparent glass or transparent plastic. For example, polymethyl methacrylate (PMMA) may be used as a material of the light guide plate 50. The light guide plate 50 may have a flat rectangular parallelepiped shape to act as an optical waveguide that delivers light. Light incident through one end of the light guide plate 50 may be delivered to the other end thereof through internal total reflection without optical loss.

The input coupler 51 may diffract light such that the light obliquely travels through the inside of the light guide plate 50. To diffract light, the input coupler 51 may have a lattice structure. For example, light incident to the input coupler 51 may be diffracted by the input coupler 51, and then obliquely travels through the inside of the light guide plate 50 at an angle greater than a threshold angle. Then, the light may travel through the inside of the light guide plate 50 by repetitive total reflection on an upper surface 50b and a lower surface 50a of the light guide plate 50.

The output coupler 55 may diffract light such that the light is output to the outside of the light guide plate 50. To diffract light, the output coupler 55 may have a lattice structure. For example, the output coupler 55 may output light by diffracting a portion of the light, which is obliquely incident to the output coupler 55. In this manner, light traveling through the inside of the light guide plate 50 may be uniformly output to the outside of the light guide plate 50 through the light-output surface of the light guide plate 50 by the output coupler 55.

As shown in FIG. 1, the light-input surface may be located in a one-side edge region of the upper surface 50b of the light guide plate 50, and the light-output surface may be located in a remaining region of the upper surface 50b of the light guide plate 50. The light source 11 and the beam deflector 30 may be disposed at a lower part side, which corresponds to the light incident side, of the light guide plate 50, which corresponds to the light-input surface of the light guide plate 50. In addition, the input coupler 51 may be disposed in a one-side edge region of the upper surface 50b of the light guide plate 50 to face the light-input surface of the light guide plate 50. The output coupler 55 may be disposed on the upper surface 50b of the light guide plate 50 and adjacent to the input coupler 51 to face the light-output surface of the light guide plate 50.

The illumination light may be incident to the input coupler 51 located on the upper surface 50b of the light guide plate 50 by passing through the lower surface 50a of the light guide plate 50. The incident illumination light is diffracted by the input coupler 51 and travels toward the lower surface 50a of the light guide plate 50 in an oblique direction. Thereafter, the illumination light is totally reflected from the lower surface 50a of the light guide plate 50 and obliquely travels toward the upper surface 50b of the light guide plate 50. A portion of the illumination light is totally reflected from the upper surface 50b of the light guide plate 50 again and travels toward the lower surface 50a of the light guide plate 50, and the other portion of the illumination light is diffracted by the output coupler 55 and output to the outside of the light guide plate 50. The illumination light output from the light guide plate 50 in this manner may be provided to the SLM 80.

Figure 2:
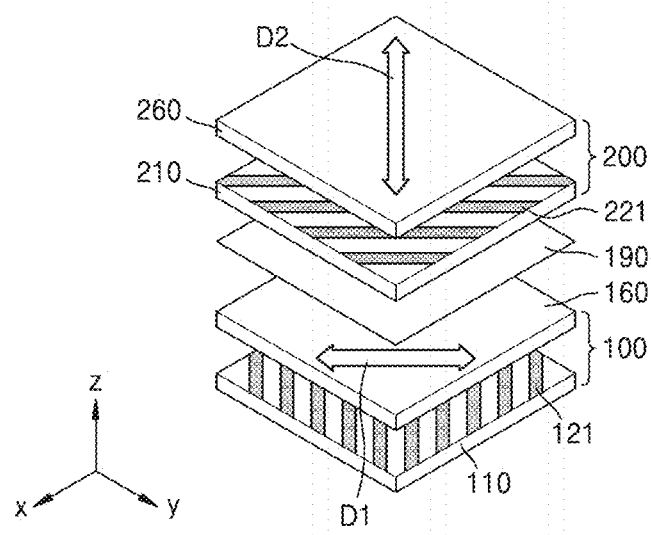
FIG. 2 illustrates the beam deflector of FIG. 1 according to an example embodiment.
Figure 3:
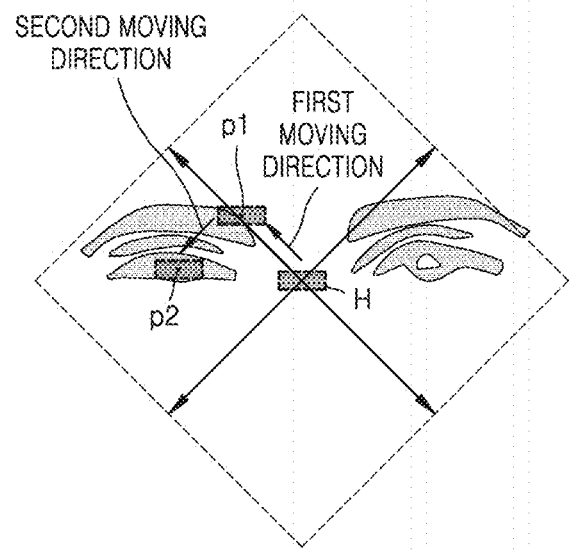
FIG. 3 illustrates movement of a holographic image H deflected by the beam deflector of FIG. 2 through two stages according to an example embodiment.
Figure 4:
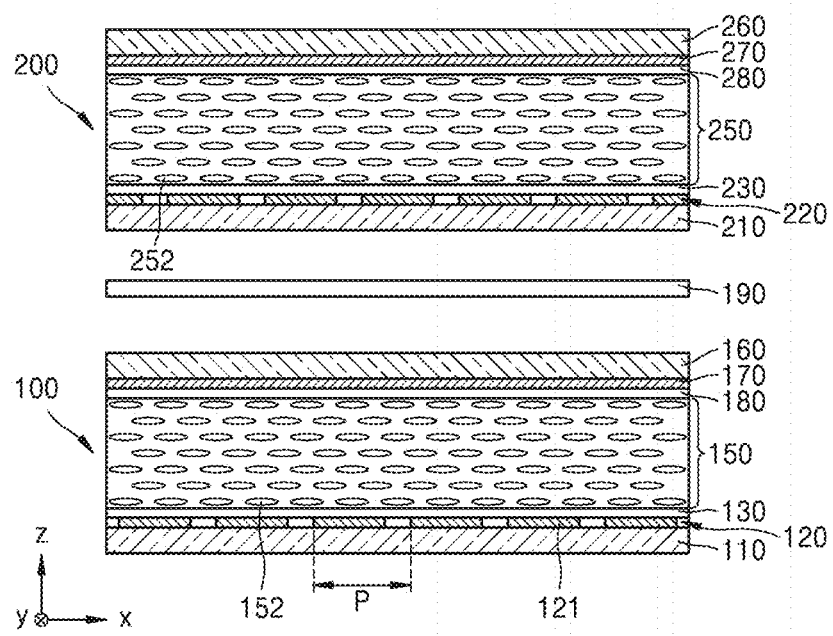
FIG. 4 illustrates a structure of one beam deflector applied to the beam deflector of FIG. 2 according to an example embodiment.

FIG. 2 illustrates a configuration of the beam deflector 30 of FIG. 1 according to an example embodiment. FIG. 3 illustrates movement of a holographic image H deflected by the beam deflector 30 of FIG. 2 through two stages. FIG. 4 illustrates a configuration of one beam deflector applied to the beam deflector 30 of FIG. 2.

Referring to FIGS. 1 to 4, the beam deflector 30 includes a first beam deflector 100 that deflects the illumination light provided from the light source 11, in a first moving direction D1 making an angle with a horizontal direction (x-axis direction) and a vertical direction (y-axis direction), such that the deflected light is oriented to a first location p1, and a second beam deflector 200 that deflects the light incident from the first beam deflector 100 such that the light is deflected in a second moving direction D2 making an angle with the horizontal direction and the vertical direction at the first location p1 and is oriented to a second location p2. In addition, the beam deflector 30 may include a polarization converter 190 provided between the first beam deflector 100 and the second beam deflector 200 to convert polarization of the light incident to the second beam deflector 200 such that the light deflected to the first moving direction D1 by the first beam deflector 100 is deflected to the second moving direction D2 by the second beam deflector 200.

The first beam deflector 100 includes a plurality of first pattern electrodes 121 arranged in the first moving direction D1 and having a stripe shape extending in a direction crossing the first moving direction D1, such that incident light is deflected in the first moving direction D1 making an angle with the horizontal direction and the vertical direction, and is oriented to the first location p1, and has liquid crystals 152 aligned such that long axes of the liquid crystals 152 are parallel to the first moving direction D1 when no electric field is applied thereto.

In addition, the second beam deflector 200 includes a plurality of second pattern electrodes 221 arranged in the second moving direction D2 and having a stripe shape extending in a direction crossing the second moving direction D2, such that the incident light is deflected in the second moving direction D2 at the first location p1, and is oriented to the second location p2 and the second moving direction D2 makes an angle with the horizontal direction and the vertical direction, and has liquid crystals 252 aligned such that long axes of the liquid crystals 252 are parallel to the second moving direction D2 when no electric field is applied thereto.

Referring to FIGS. 2 and 4, the first beam deflector 100 includes a first electrode layer 120 having the plurality of first pattern electrodes 121 provided on a first substrate 110, a second electrode layer 170 used as a common electrode provided on a second substrate 160, and a liquid crystal layer 150 having the liquid crystals 152 aligned between the first substrate 110 and the second substrate 160 such that the long axes of the liquid crystals 152 are parallel to the first moving direction D1 when no electric field is applied thereto.

The first substrate 110 and the second substrate 160 may be insulating substrates and may be made of glass or transparent plastic.

The first pattern electrodes 121 may be arranged in the first moving direction D1 making a certain angle, for example, an angle of 45° or less, with the horizontal direction (x-axis direction) and have a stripe shape extending in a direction crossing the first moving direction D1. The first pattern electrodes 121 may be made of a transparent conductive material. For example, the first pattern electrodes 121 may include indium tin oxide (ITO), indium zinc oxide (IZO), or indium tin zinc oxide (ITZO).

The second electrode layer 170 may be a flat-type common electrode. As an example, like the first electrode layer 120, the second electrode layer 170 may include a plurality of pattern electrodes. In this case, the same voltage may be applied to the pattern electrodes of the second electrode layer 170. The second electrode layer 170 may be made of the transparent conductive material similar to the first electrode layer 120.

A first alignment layer 130 covering the first electrode layer 120 may be formed on the first substrate 110. A second alignment layer 180 covering the second electrode layer 170 may be formed on the second substrate 160. The first and second alignment layers 130 and 180 may be provided to align the liquid crystals 152 such that the long axes of the liquid crystals 152 are parallel to the first moving direction D1 when no electric field is applied thereto. The first and second alignment layers 130 and 180 may be made of, for example, polyimide. A plurality of spacers made of, for example, a polymer material may be further included between the first substrate 110 and the second substrate 160. The spacers may have a diameter of, for example, 2.5 to 3 μm. A gap between the first substrate 110 and the second substrate 160 may be maintained by the spacers.

The liquid crystal layer 150 may be formed by injecting the liquid crystals 152 into a space between the first and second substrates 110 and 160. In this case, the liquid crystals 152 may be arranged such that the long axes thereof are in parallel to an arrangement direction of the plurality of first pattern electrodes 121 when no electric field is applied thereto. As such, according to the alignment of the liquid crystals 152, when a voltage is applied between the first pattern electrodes 121 of the first electrode layer 120 and the second electrode layer 170, the arrangement of the liquid crystals 152 is changed, and accordingly, incident light may be phase-modulated such that the incident light is deflected.

The second beam deflector 200 includes a first electrode layer 220 having the plurality of second pattern electrodes 221 provided on a first substrate 210, a second electrode layer 270 used as a common electrode provided on a second substrate 260, and a liquid crystal layer 250 having the liquid crystals 252 aligned between the first substrate 210 and the second substrate 260 such that the long axes of the liquid crystals 252 are parallel to the second moving direction D2 when no electric field is applied thereto.

The first substrate 210 and the second substrate 260 may be insulating substrates and may be made of glass or transparent plastic.

The second pattern electrodes 221 may be arranged in the second moving direction D2 making a certain angle, for example, an angle of 45° or less, with the vertical direction (y-axis direction) and have a stripe shape extending in a direction crossing the second moving direction D2.

The second pattern electrodes 221 may be made of a transparent conductive material. For example, the second pattern electrodes 221 may include ITO, IZO, or ITZO.

The second electrode layer 270 may be a flat-type common electrode. For example, like the first electrode layer 220, the second electrode layer 270 may include a plurality of pattern electrodes. In this case, the same voltage may be applied to the pattern electrodes of the second electrode layer 270. The second electrode layer 270 may be made of the transparent conductive material similar to the first electrode layer 220.

A first alignment layer 230 covering the first electrode layer 220 may be formed on the first substrate 210. A second alignment layer 280 covering the second electrode layer 270 may be formed on the second substrate 260. The first and second alignment layers 230 and 280 may be provided to align the liquid crystals 252 such that the long axes of the liquid crystals 252 are parallel to the second moving direction D2 when no electric field is applied thereto. The first and second alignment layers 230 and 280 may be made of, for example, polyimide. A plurality of spacers made of, for example, a polymer material, may be further included between the first substrate 210 and the second substrate 260. The spacers may have a diameter of, for example, 2.5 to 3 μm. A gap between the first substrate 210 and the second substrate 260 may be maintained by the spacers.

The liquid crystal layer 250 may be formed by injecting the liquid crystals 252 into a space between the first and second substrates 210 and 260. In this case, the liquid crystals 252 may be arranged such that the long axes thereof are in parallel to an arrangement direction of the plurality of second pattern electrodes 221 when no electric field is applied thereto. As such, according to the alignment of the liquid crystals 252, when a voltage is applied between the second pattern electrodes 221 of the first electrode layer 220 and the second electrode layer 270, the arrangement of the liquid crystals 252 is changed, and accordingly, incident light may be phase-modulated such that the incident light is deflected.

As described above, in the first beam deflector 100 and the second beam deflector 200, when no electric field is applied to the liquid crystals 152 and 252, the long-axis arrangement of the liquid crystals 152 and 252 is vertical to a stripe pattern of the plurality of first pattern electrodes 121 and second pattern electrodes 221, and accordingly, incident light is also input orthogonal to the stripe pattern and in parallel to the long axes of the liquid crystals 152 and 252. Therefore, when no electric field is applied, the long axes of the liquid crystals 152 and 252 are aligned in parallel to the first moving direction D1 and the second moving direction D2, respectively.

In the first and second beam deflectors 100 and 200, the first and second pattern electrodes 121 and 221 may be arranged at a constant pitch P in the first moving direction D1 and the second moving direction D2, respectively. For example, the pitch P of the first and second pattern electrodes 121 and 221 may be approximately 2 μm. As the pattern pitch P is formed narrower, a light deflection angle of the first and second beam deflectors 100 and 200 may increase. The first and second pattern electrodes 121 and 221 may have the same width. The width of the first and second pattern electrodes 121 and 221 may be approximately 1.5 μm, and a length thereof may be approximately 14 mm. The first and second electrode layers 120 and 220 may include, for example, 7200 first pattern electrodes 121 and 7200 second pattern electrodes 221, respectively.

Figure 5:
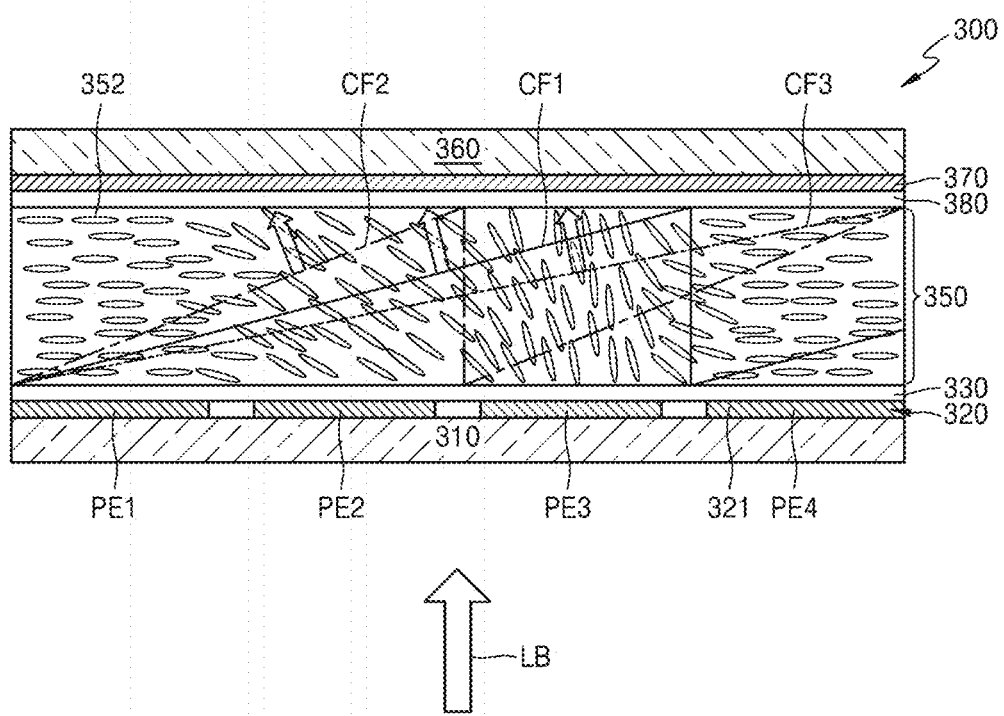
FIG. 5 illustrates a description of the principle that incident light is deflected by a beam deflector according to an example embodiment.

FIG. 5 illustrates a description of the principle that incident light is deflected by the beam deflector 300.

The principle in FIG. 5 that incident light is deflected by the beam deflector 300 is substantially the same as the principle that incident light is deflected by the first and second beam deflectors 100 and 200 of the beam deflector 30 according to an embodiment.

Referring to FIG. 5, the beam deflector 300 may include a first electrode layer 320 having a plurality of pattern electrodes 321 provided on a first substrate 310, a second electrode layer 370 used as a common electrode provided on a second substrate 360, and a liquid crystal layer 350 having liquid crystals 352 aligned between the first substrate 310 and the second substrate 360 such that long axes of the liquid crystals 352 are parallel to a moving direction in which light is deflected and moved by the beam deflector 300 when no electric field is applied thereto.

The first substrate 310 and the second substrate 360 may be insulating substrates and may be made of glass or transparent plastic.

The pattern electrodes 321 may be arranged in a moving direction making a certain angle, for example, an angle of 45° or less, with the horizontal direction (x-axis direction) and have a stripe shape extending in a direction crossing the moving direction. The pattern electrodes 321 may be made of a transparent conductive material. For example, the pattern electrodes 321 may include ITO, IZO, or ITZO.

The second electrode layer 370 may be a flat-type common electrode. As an example, like the first electrode layer 320, the second electrode layer 370 may include a plurality of pattern electrodes. In this case, the same voltage may be applied to the pattern electrodes of the second electrode layer 370. The second electrode layer 370 may be made of the transparent conductive material as the first electrode layer 320.

A first alignment layer 330 covering the first electrode layer 320 may be formed on the first substrate 310. A second alignment layer 380 covering the second electrode layer 370 may be formed on the second substrate 360. The first and second alignment layers 330 and 380 may be provided to align the liquid crystals 352 such that the long axes of the liquid crystals 352 are parallel to the moving direction when no electric field is applied thereto. The first and second alignment layers 330 and 380 may be made of, for example, polyimide. A plurality of spacers made of, for example, a polymer material may be further included between the first substrate 310 and the second substrate 360. The spacers may have a diameter of, for example, 2.5 to 3 μm. A gap between the first substrate 310 and the second substrate 360 may be maintained by the spacers.

The liquid crystal layer 350 may be formed by injecting the liquid crystals 352 into a space between the first and second substrates 310 and 360. In this case, the liquid crystals 352 may be arranged such that the long axes thereof are in parallel to an arrangement direction of the plurality of pattern electrodes 321 when no electric field is applied thereto. As such, according to the alignment of the liquid crystals 352, when a voltage is applied between the pattern electrodes 321 of the first electrode layer 320 and the second electrode layer 370, the arrangement of the liquid crystals 352 is changed, and accordingly, incident light may be phase-modulated such that the incident light is deflected.

When a certain electric field distribution is formed in the liquid crystal layer 350 according to a voltage applied between the first electrode layer 320 and the second electrode layer 370, the liquid crystals 352 are aligned depending on an electric field direction. For example, when dielectric anisotropy of the liquid crystals 352 is positive, a director, i.e., a long-axis direction of the liquid crystals 352 may be oriented in the electric field direction, and when the dielectric anisotropy thereof is negative, the long-axis direction may be oriented in a direction orthogonal to the electric field direction. Different voltages may be applied to the pattern electrodes 321 of the first electrode layer 320, and in this case, aligned shapes of the liquid crystals 352 may vary at respective locations as illustrated in FIG. 5. Since the liquid crystals 352 have different refractive indices in long-axis and short-axis directions, the liquid crystal layer 350 may have an index gradient depending on a direction distribution of the liquid crystals 352. An optical path change surface is represented as a boundary surface on which an index gradient, i.e., a change in a refractive index, occurs in the liquid crystal layer 350, and light deflected in a certain direction due to refraction of incident light on the boundary surface is output from the beam deflector 300. An angle of the slope of the optical path change surface may be adjusted by adjusting a director distribution of the liquid crystals 352 according to an electric field distribution in the liquid crystal layer 350. In other words, a deflection direction of incident light may be adjusted according to a voltage applied between the first electrode layer 320 and the second electrode layer 370.

FIG. 5 shows a case where four pattern electrodes 321, e.g., first, second, third, and fourth pattern electrodes PE1, PE2, PE3, and PE4, are formed on the first substrate 310, for convenience of description. An electric field is formed in a corresponding pattern electrode region by a voltage applied between each of the first to fourth pattern electrodes PE1 to PE4 and the common electrode 370. When a ground voltage is applied to the common electrode 370, and a voltage of 0 V is applied to the first pattern electrode PE1, the liquid crystals 352 may be arranged in parallel to the first substrate 310. That is, when 0 V is applied, the liquid crystals 352 maintain an initial arrangement state.

In response to an increase in a voltage applied to a pattern electrode, the liquid crystals 352 are moved in a direction orthogonal to the first substrate 310. When the applied voltage reaches a threshold voltage, the liquid crystals 352 may be arranged in orthogonal to the first substrate 310. The threshold voltage, e.g., 5 V, may be applied to the third pattern electrode PE3, and an intermediate voltage, e.g., 2.5 V, may be applied to the second pattern electrode PE2. In response to an increase in voltages applied to the first to fourth pattern electrodes PE1 to PE4, retardation of light may increase, and accordingly, a phase of light incident to a corresponding pattern electrode may be retarded. When the liquid crystals 352 are aligned in orthogonal to the first substrate 310 by applying the threshold voltage to a pattern electrode, retardation of light incident to a corresponding electrode region may be 2π.

In response to an increase in voltages applied to the first to fourth pattern electrodes PE1 to PE4, retardation of light increases, and accordingly, an optical path change surface CF1 is formed in a certain region (three pattern electrode regions in FIG. 5). That is, a virtual prism is formed. This virtual prism may repetitively appear along an arrangement direction of pattern electrodes of the beam deflector 300. The number (m) of pattern electrodes forming one virtual prism may vary depending on a voltage applied to the pattern electrodes. That is, 0 V and the threshold voltage (5 V) are sequentially applied to two adjacent pattern electrodes, and one prism per two pattern electrodes may be formed. In FIG. 5, an optical path change surface CF2 is marked with alternate long and short dash line. Herein, m denotes an integer and may be one of 2 to n, where n is an integer, and n pattern electrodes form a unit electrode as described below.

For example, when voltages are sequentially applied to the first to fourth pattern electrodes PE1 to PE4, that is, when voltages, for example, 0 V, 5/3 V, 10/3 V, and 5 V, are applied to the first to fourth pattern electrodes PE1 to PE4, respectively, one optical path change surface CF3 (alternate long and two short dashes line in FIG. 5) per four pattern electrodes may be formed. That is, when 0 V to the threshold voltage (5 V) are sequentially applied to m pattern electrodes, one virtual prism may be formed in m pattern electrode regions. Herein, the threshold voltage (5 V) is illustrative, and the threshold voltage may be variously changed according to the configuration of the beam deflector.

Light LB incident to the first substrate 310 is refracted on the optical path change surfaces CF1, CF2, and CF3 and output. The light LB may be one of red light, green light, and blue light. Since refractive indices of the optical path change surfaces CF1, CF2, and CF3 are adjusted by adjusting voltages to be applied to pattern electrodes, a refraction angle of light passing through the liquid crystal layer 350 may be adjusted. That is, since a path of light is changed by a voltage applied to a pattern electrode, when this light deflection function is used, red light, green light, and blue light may be output in the same direction.

Figure 6:
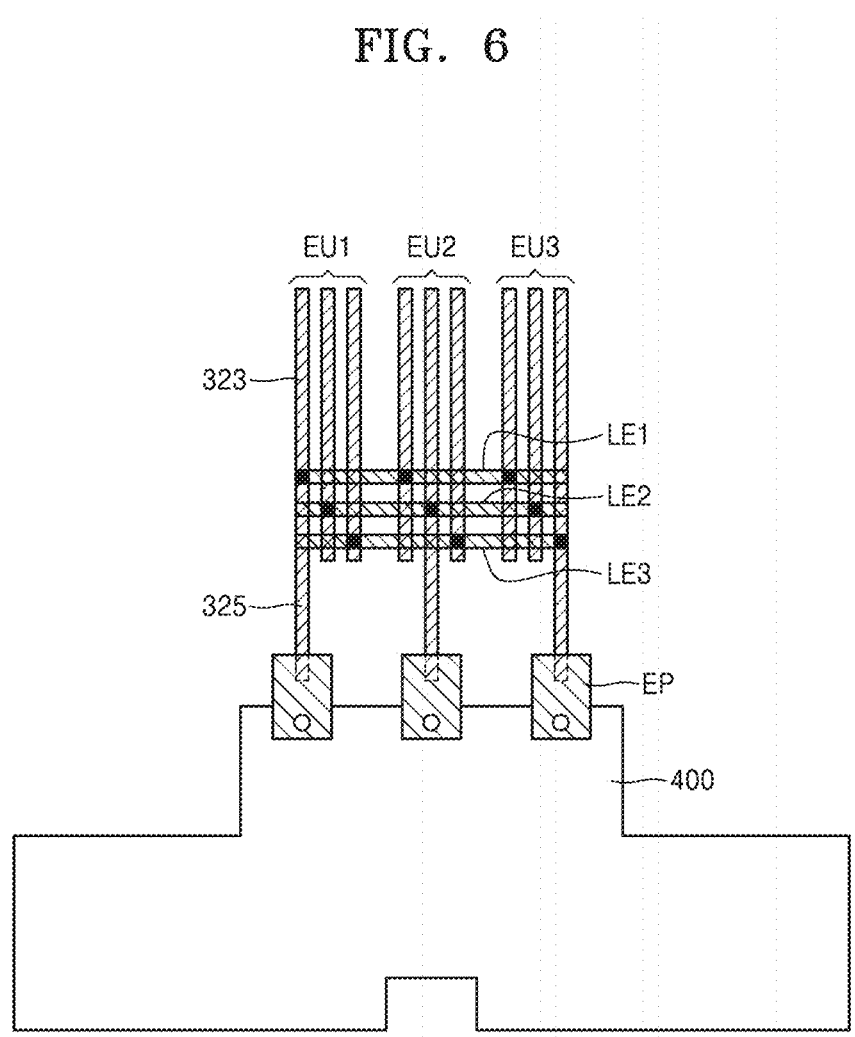
FIG. 6 is a top view illustrating an arrangement of pattern electrodes of a first electrode layer of a beam deflector according to an example embodiment.

FIG. 6 is a top view showing an arrangement of the pattern electrodes 321 of the first electrode layer 320 of the beam deflector 300 and shows a part at which a plurality of pattern electrodes 321 of the first electrode layer 320 are connected to line electrodes LE1, LE2, and LE3. In FIG. 6, reference numeral 323 denotes the part at which the pattern electrodes 321 are connected to the line electrodes LE1, LE2, and LE3, and the pattern electrodes 321 at this connection part may be arranged in the horizontal direction or the vertical direction.

Referring to FIG. 6, the first electrode layer 320 includes the plurality of pattern electrodes 321. The pattern electrodes 323 at the part at which the plurality of pattern electrodes 321 are connected to the line electrodes LE1, LE2, and LE3 may be grouped into a plurality of, e.g., 7 to 10, unit electrodes. Each unit electrode may include n, e.g., 720, pattern electrodes 323. The n pattern electrodes 323 may correspond to channels of a driving integrated chip (IC) used in a holographic display. For example, each unit electrode may include 720 pattern electrodes 323 to correspond to 720 channels of the driving IC used in the holographic display. When the driving IC includes 1024 channels, each unit electrode may include 1024 pattern electrodes 323. Hereinafter, an example where the pattern electrodes 323 are grouped into 10 unit electrodes such that the first electrode layer 320 includes 7200 pattern electrodes will be described.

When a pitch of the pattern electrodes 321 of the beam deflector 300 is relatively narrow, for example, approximately 2 μm, a deflection angle of light increases, and the number of pattern electrodes 323 included in one unit electrode region may increase, and thus, resolution of a display apparatus employing a liquid crystal light deflector may be improved.

FIG. 6 illustrates a case where the first electrode layer 320 includes three unit electrodes, i.e., first, second, and third unit electrodes EU1, EU2, and EU3, each unit electrode including three pattern electrodes 323.

ith pattern electrodes 323 of the respective first, second, and third unit electrodes EU1, EU2, and EU3 are electrically connected to each other by an ith line electrode LE. Three dark points connected to the ith line electrode LE indicate via metals (420 of FIG. 7) connecting the ith pattern electrodes 323 and the ith line electrode LE.

One of 10 pattern electrodes 323 connected to the ith line electrode LE may include an extension part 325 for external connection. That is, the pattern electrodes 323 of the first electrode layer 320 may include 720 extension parts 325. The extension parts 325 may be arranged at constant intervals. For example, the extension parts 325 may be arranged at an interval (20 μm) of 10 pattern electrodes 323. In this case, the extension parts 325 of the first unit electrode EU1 may be extension parts of $1^{st}$, $11^{th}$, $21^{st}$, ..., and $711^{th}$ pattern electrodes, and the extension parts 325 of the second unit electrode EU2 may be extension parts of $2^{nd}$, $12^{th}$, $22^{nd}$, ..., and $712^{th}$ pattern electrodes. In this manner, 720 extension parts 325 may be formed.

Each extension part 325 may be connected to a corresponding electrode pad EP. That is, 720 electrode pads EP may be formed. The electrode pad EP may be formed of a metal, e.g., molybdenum (Mo).

The electrode pads EP may be bonded to a driving IC 400. As illustrated in FIG. 6, a white circle formed on the electrode pad EP is an electrical connection part between the electrode pad EP and the driving IC 400. This white circle is a region for an anisotropic conductive film bonding through a second via hole H2 of FIG. 7E, which is described below.

A voltage may be discriminatively applied to 720 pattern electrodes 323 through 720 electrode pads EP. As a result, a desired voltage may be discriminatively applied to 720 electrode pads EP in respective unit electrodes EU. Accordingly, light may be deflected by forming a desired-sized prism for each unit electrode EU.

FIGS. 7A to 7E are cross-sectional views for describing a method of connecting a pattern electrode 321 and an electrode pad of the beam deflector 300, according to an example embodiment. Like reference numerals in FIGS. 5 and 6 refer to like elements.

Figure 7A:
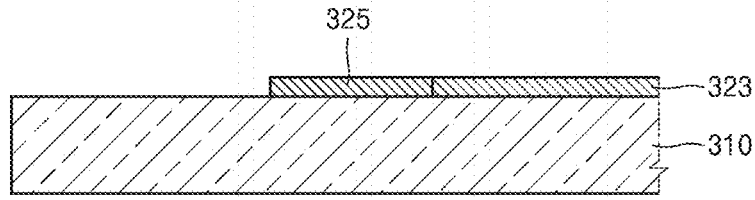
FIGS. 7A to 7E are cross-sectional views illustrating a method of connecting a pattern electrode and an electrode pad of the beam deflector, according to an example embodiment.

Referring to FIG. 7A, a plurality of pattern electrodes 323 are formed by coating an ITO material on the first substrate 310 and then patterning the ITO material. 7200 pattern electrodes 323 may be formed. 720 extension parts 325 are formed by extending a certain part from 720 pattern electrodes 323. The extension parts 325 may be formed at equal intervals. The extension parts 325 may be formed at an interval of approximately 20 μm. A pitch of each pattern electrode 323 is approximately 2 μm, and stepper equipment capable of etching 1 μm or less may be used for patterning each pattern electrode 323.

Figure 7B:
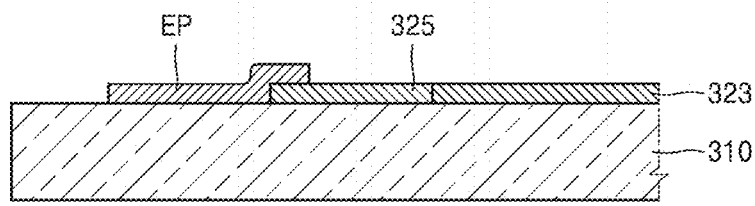

Referring to FIG. 7B, an electrode pad EP is formed on and in contact with the extension part 325. The electrode pad EP may be formed of Mo. In this case, aligner equipment may be used. Since a threshold line width of an aligner may be approximately 5 μm, the aligner may be used to form electrode pads EP at an interval of approximately 20 μm.

Figure 7C:
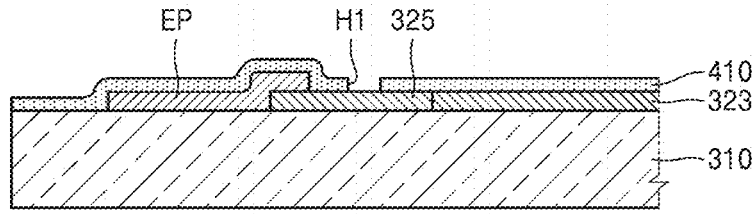

Referring to FIG. 7C, an insulating layer 410 covering the pattern electrodes 323 and the electrode pads EP may be formed on the first substrate 310. The insulating layer 410 may be formed of silicon oxide (SiO).

A first via hole H1 through which each extension part 325 is exposed may be formed in the insulating layer 410. The first via hole H1 may be formed such that 10 first via holes H1 through which ith pattern electrodes 323 in each unit electrode are exposed are aligned in, for example, the horizontal direction or the vertical direction.

Figure 7D:
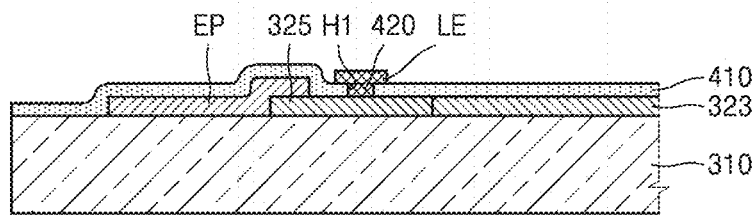

Referring to FIG. 7D, the aligned first via holes H1 are filled with metal vias 420, and line electrodes LE connecting corresponding metal vias 420 may be formed on the insulating layer 410. 720 line electrodes LE may be formed in parallel to each other. The line electrodes LE may be formed orthogonal to the pattern electrode 323.

Figure 7E:
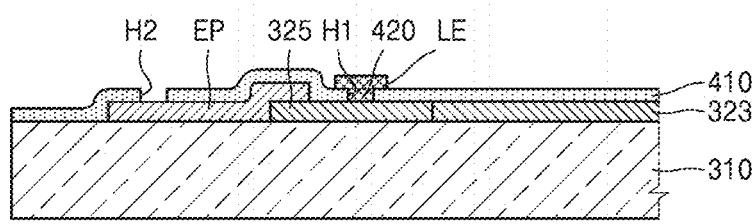

Referring to FIG. 7E, a second via hole H2 through which the electrode pad EP is exposed may be formed in the insulating layer 410. Thereafter, the electrode pads EP and the driving IC 400 may be connected by using a bonding method. A voltage input from the driving IC 400 may be applied to corresponding ith pattern electrodes 323 of each unit electrode through corresponding electrode pads EP and extension parts 325.

Referring to FIGS. 2 and 4, each of the first beam deflector 100 and the second beam deflector 200 of the beam deflector 30 may employ the beam deflector 300 described with reference to FIGS. 5 to 7E. The beam deflector 30 may be implemented by arranging two beam deflectors 300 described with reference to FIGS. 5 to 7E such that pattern electrodes 321 cross each other and placing the polarization converter 190 between the two beam deflectors 300. For example, when the pattern electrodes 321 are formed at an angle of 45° with the horizontal direction and the vertical direction, the beam deflector 30 may be implemented by arranging the same two beam deflectors 300 such that the pattern electrodes 321 cross each other and placing the polarization converter 190 between the two beam deflectors 300.

The polarization converter 190 converts polarization of light such that a polarizing direction of light polarized in the first moving direction by the first beam deflector 100 is parallel to the long-axis direction of the liquid crystals 152 in the second beam deflector 200. The polarization converter 190 may include, for example, a quarter waveplate.

According to the beam deflector 30 of an example embodiment, image noise may be deviated from an eye of an observer, and thus, the observer may view only a holographic image.

Figure 10:
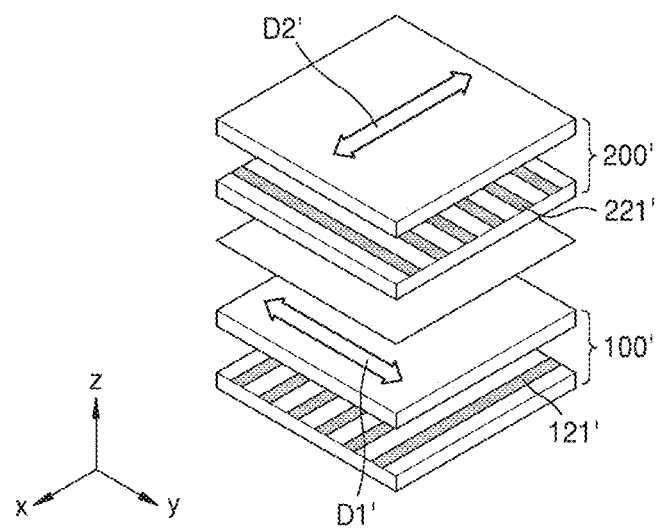
FIG. 10 illustrates a beam deflector according to a comparative example.

FIG. 10 illustrates a beam deflector including a first beam deflector 100' having first pattern electrodes 121' arranged in the horizontal direction (x-axis direction) and a second beam deflector 200' having second pattern electrodes 221' arranged in the vertical direction (y-axis direction) according to a relate art beam deflector.

Figure 11:
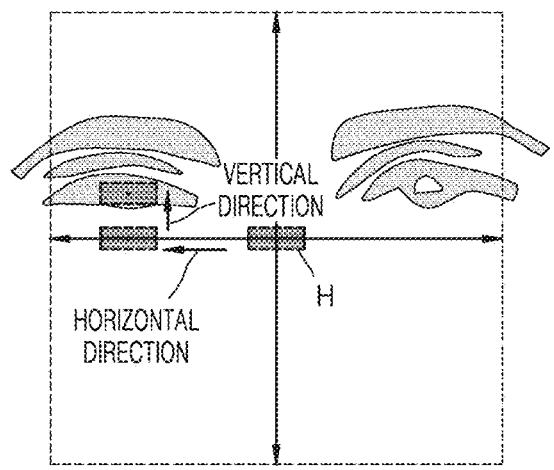
FIG. 11 illustrates a moving path of the holographic image H when a beam is deflected by the beam deflector illustrated in FIG. 10.

As shown in FIG. 10, when the first and second pattern electrodes 121' and 221' are arranged in the horizontal direction and the vertical direction, respectively, a holographic image H is deflected in the horizontal direction by the first beam deflector 100' and then deflected in the vertical direction by the second beam deflector 200', as shown in FIG. 11.

Figure 12:
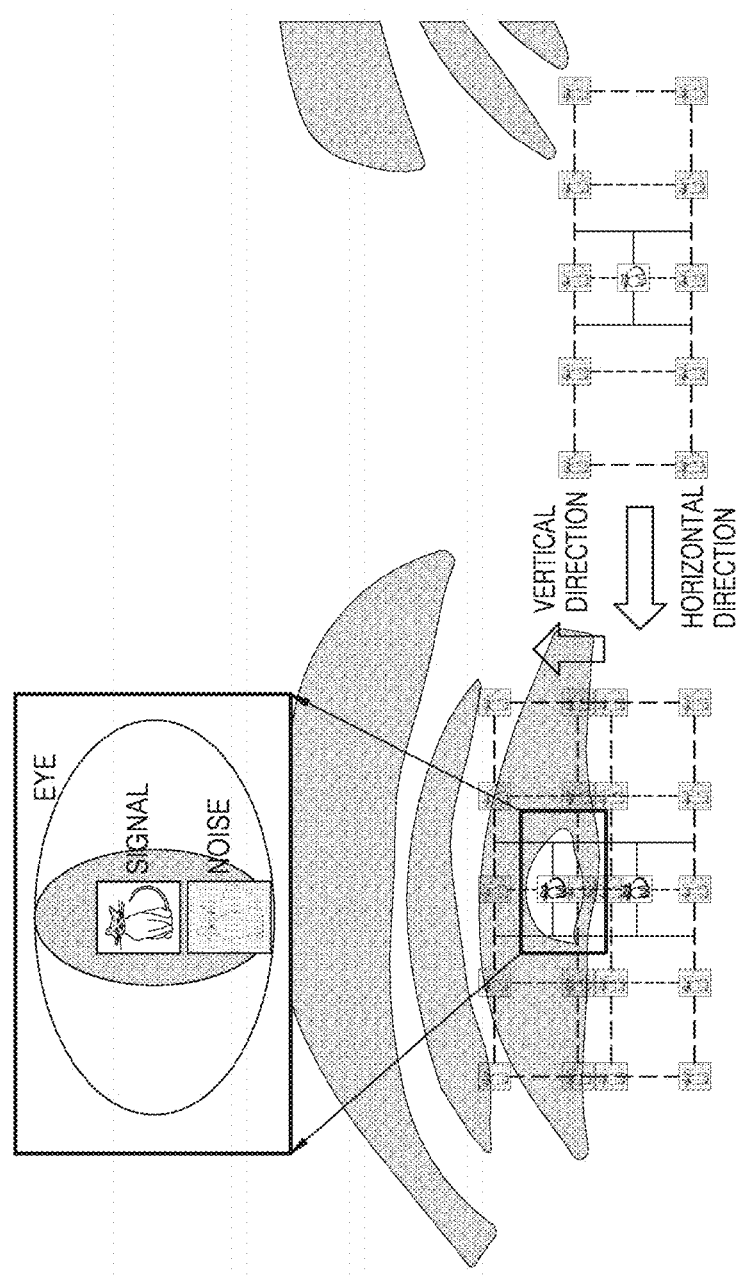
FIG. 12 illustrates the occurrence of crosstalk when the beam deflector illustrated in FIG. 10 is used.

In this case, when small beam deflection in the vertical direction is achieved, crosstalk may occur as shown in FIG. 12, and thus, not only the holographic image H, i.e., a signal, but also image noise are input to the eyes of the observer.

Figure 13:
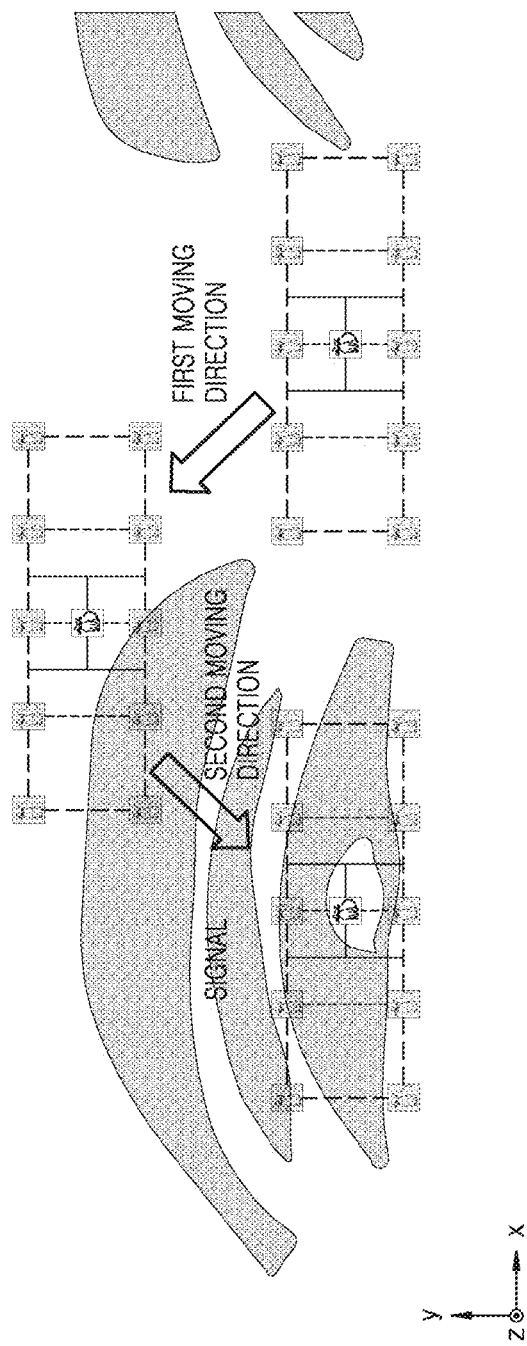
FIG. 13 illustrates only a signal of a holographic image being input to an eye of an observer and image noise being deviated from the eye of the observer, through a two-stage movement when the beam deflector according to an example embodiment is used.

In contrast, as in the beam deflector 30 according to an example embodiment, when light provided from the light source 11 is deflected in the first moving direction D1 making an angle with the horizontal direction and the vertical direction, i.e., an oblique direction, by the first beam deflector 100, and then is deflected in the second moving direction D2 making an angle with the horizontal direction and the vertical direction, i.e., an oblique direction, by the second beam deflector 200, only the holographic image H, i.e., a signal, is input to the eye of the observer, as shown in FIG. 13, and image noise is deviated from the eye of the observer, and thus, the observer may view only the holographic image H without crosstalk.

According to a beam deflector according to an example embodiment, a first beam deflector that deflects illumination light provided from a light source, in a first moving direction making an angle with the horizontal direction and the vertical direction, such that the deflected light orients to a first location, and a second beam deflector that deflects the light incident from the first beam deflector such that the light is deflected in a second moving direction making an angle with the horizontal direction and the vertical direction at the first location and orients to a second location are included to deflect the illumination light through two stages.

According to a holographic 3D image display apparatus employing the beam deflector according to an example embodiment, only a holographic image is input to an eye of an observer, and image noise may be deviated from the eye of the observer, and thus the observer may view only the holographic image without crosstalk.

It should be understood that embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the present disclosure as defined by the following claims.

What is claimed is:

1. A beam deflector comprising:
 a first beam deflector which comprises a plurality of first pattern electrodes provided in a first moving direction and having a stripe shape extending in a direction crossing the first moving direction, the first beam deflector being configured to deflect incident light in the first moving direction making an angle with a horizontal direction and a vertical direction, respectively, and oriented to a first location, and the first beam deflector comprising liquid crystals aligned such that long axes of the liquid crystals are parallel to the first moving direction when an electric field is not applied thereto;
 a second beam deflector which comprises a plurality of second pattern electrodes provided in a second moving direction and having a stripe shape extending in a direction crossing the second moving direction, the second beam deflector being configured to deflect the incident light that is deflected by the first beam deflector in the second moving direction making an angle with the horizontal direction and the vertical direction, respectively, at the first location, and oriented to a second location, and the second beam deflector comprising liquid crystals aligned such that long axes of the liquid crystals are parallel to the second moving direction when an electric field is not applied thereto; and
 a polarization converter provided between the first beam deflector and the second beam deflector and configured to convert polarization of the light incident to the second beam deflector such that the incident light deflected to the first moving direction by the first beam deflector is deflected to the second moving direction by the second beam deflector.

2. The beam deflector of claim 1, wherein the first beam deflector comprises:
 a first electrode layer comprising the plurality of first pattern electrodes on a first substrate;

a second electrode layer used as a common electrode on a second substrate; and a first liquid crystal layer comprising liquid crystals aligned between the first substrate and the second substrate such that long axes of the liquid crystals are parallel to the first moving direction when the electric field is not applied thereto, and wherein the second beam deflector comprises:

a third electrode layer comprising the plurality of second pattern electrodes on a third substrate;

a fourth electrode layer used as a common electrode on a fourth substrate; and a second liquid crystal layer comprising liquid crystals aligned between the third substrate and the fourth substrate such that long axes of the liquid crystals are parallel to the second moving direction when the electric field is not applied thereto.

3. The beam deflector of claim 1, wherein the polarization converter comprises a quarter waveplate.

4. The beam deflector of claim 1, wherein the first moving direction and the second moving direction make an angle of 45° or less with the horizontal direction and the vertical direction, respectively.

5. The beam deflector of claim 1, wherein the plurality of first pattern electrodes and the plurality of second pattern electrodes make an angle of 45° or less with the horizontal direction and the vertical direction.

6. The beam deflector of claim 1, wherein the plurality of first pattern electrodes and the plurality of second pattern electrodes comprise a plurality of unit electrodes, each unit electrode comprising n pattern electrodes, and wherein ith pattern electrodes of respective unit electrodes are electrically connected to each other such that a same voltage is applied to each of the ith pattern electrodes.

7. The beam deflector of claim 6, wherein the n pattern electrodes comprise 720 or 1024 pattern electrodes, and the plurality of unit electrodes comprise 7 to 10 unit electrodes.

8. The beam deflector of claim 6, comprising n line electrodes comprising an ith line electrode connecting the ith pattern electrodes of the respective unit electrodes.

9. The beam deflector of claim 8, wherein the n line electrodes are provided in a direction parallel to the horizontal direction or the vertical direction.

10. A backlight unit comprising:

a light source configured to emit light;

a beam deflector configured to deflect the light emitted by the light source through two stages; and a light guide plate configured to guide the light deflected by the beam deflector and configured to output the light through a light-output surface of the light guide plate, wherein the beam deflector comprises:

a first beam deflector which comprises a plurality of first pattern electrodes provided in a first moving direction and having a stripe shape extending in a direction crossing the first moving direction, the first beam deflector being configured to deflect incident light in the first moving direction making an angle with a horizontal direction and a vertical direction, respectively, and oriented to a first location, and the first beam deflector comprising liquid crystals aligned such that long axes of the liquid crystals are parallel to the first moving direction when an electric field is not applied thereto;

a second beam deflector which comprises a plurality of second pattern electrodes provided in a second moving direction and having a stripe shape extending in a direction crossing the second moving direction, the second beam deflector being configured to deflect the incident light that is deflected by the first beam deflector in the second moving direction making an angle with the horizontal direction and the vertical direction, respectively, at the first location, and oriented to a second location, and the second beam deflector comprising liquid crystals aligned such that long axes of the liquid crystals are parallel to the second moving direction when an electric field is not applied thereto; and a polarization converter provided between the first beam deflector and the second beam deflector and configured to convert polarization of the light incident to the second beam deflector such that the incident light deflected to the first moving direction by the first beam deflector is deflected to the second moving direction by the second beam deflector.

11. A holographic three-dimensional (3D) image display apparatus comprising:

a backlight unit configured to emit light; and a spatial light modulator configured to form a holographic image by modulating the light emitted by the backlight unit, wherein the backlight unit comprises:

a light source configured to emit the light;

a beam deflector configured to deflect the light emitted by the light source through two stages, the beam deflector comprising a first beam deflector configured to deflect the light emitted by the light source in a first moving direction making an angle with a horizontal direction and a vertical direction, respectively, such that the deflected light is oriented to a first location, and a second beam deflector configured to deflect the light deflected from the first beam deflector such that the light is deflected in a second moving direction making an angle with the horizontal direction and the vertical direction, respectively, at the first location and is oriented to a second location; and a light guide plate configured to guide the light deflected from the beam deflector and output the light through a light-output surface of the light guide plate.

12. The holographic 3D image display apparatus of claim 11, wherein the first beam deflector comprises a plurality of first pattern electrodes provided in the first moving direction and having a stripe shape extending in a direction crossing the first moving direction, the first beam deflector being configured to deflect incident light in the first moving direction and oriented to the first location, and the first beam deflector comprising liquid crystals aligned such that long axes of the liquid crystals are parallel to the first moving direction when an electric field is not applied thereto, the second beam deflector comprises a plurality of second pattern electrodes provided in the second moving direction and having a stripe shape extending in a direction crossing the second moving direction, the second beam deflector being configured to deflect the incident light that is deflected by the first beam deflector in the second moving direction at the first location and oriented to the second location, and the second beam deflector comprising liquid crystals aligned such that long axes of the liquid crystals are parallel to the second moving direction when an electric field is not applied thereto, and the beam deflector further comprises a polarization converter provided between the first beam deflector and the second beam deflector and configured to convert polarization of the light incident to the second beam deflector such that the light deflected to the first moving direction by the first beam deflector is deflected to the second moving direction by the second beam deflector.

13. The holographic 3D image display apparatus of claim 12, wherein the first beam deflector comprises:
a first electrode layer comprising the plurality of first pattern electrodes on a first substrate;
a second electrode layer used as a common electrode on a second substrate; and
a first liquid crystal layer comprising liquid crystals aligned between the first substrate and the second substrate such that long axes of the liquid crystals are parallel to the first moving direction when the electric field is not applied thereto, and
wherein the second beam deflector comprises:
a third electrode layer comprising the plurality of second pattern electrodes on a third substrate;
a fourth electrode layer used as a common electrode on a fourth substrate; and
a second liquid crystal layer comprising liquid crystals aligned between the third substrate and the fourth substrate such that long axes of the liquid crystals are parallel to the second moving direction when the electric field is not applied thereto.

14. The holographic 3D image display apparatus of claim 12, wherein the polarization converter comprises a quarter waveplate.

15. The holographic 3D image display apparatus of claim 12, wherein the plurality of first pattern electrodes and the plurality of second pattern electrodes comprise a plurality of unit electrodes, each unit electrode comprising n pattern electrodes, and
wherein ith pattern electrodes of respective unit electrodes are electrically connected to each other such that a same voltage is applied to each of the ith pattern electrodes.

16. The holographic 3D image display apparatus of claim 15, wherein the n pattern electrodes comprise 720 or 1024 pattern electrodes, and the plurality of unit electrodes comprise 7 to 10 unit electrodes.

17. The holographic 3D image display apparatus of claim 15, comprising n line electrodes comprising an ith line electrode connecting the ith pattern electrodes of the respective unit electrodes.

18. The holographic 3D image display apparatus of claim 17, wherein the n line electrodes are provided in a direction parallel to the horizontal direction or the vertical direction, respectively.

19. The holographic 3D image display apparatus of claim 11, wherein the first moving direction and the second moving direction make an angle of 45° or less with the horizontal direction and the vertical direction, respectively.

20. The holographic 3D image display apparatus of claim 12, wherein the plurality of first pattern electrodes and the plurality of second pattern electrodes make an angle of 45° or less with the horizontal direction and the vertical direction.

* * * * *